(12) United States Patent
Naushad et al.

(10) Patent No.: US 11,618,004 B1
(45) Date of Patent: Apr. 4, 2023

(54) MELAMINE-FORMALDEHYDE DERIVED POROUS CARBON ADSORBENT

(71) Applicant: KING SAUD UNIVERSITY, Riyadh (SA)

(72) Inventors: Mu Naushad, Riyadh (SA); Tansir Ahamad, Riyadh (SA); Ayoub Abdullah Alqadami, Riyadh (SA); Ayman Abdelghafar Ahmed, Riyadh (SA); Zeid Abdullah Alothman, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 16/912,201

(22) Filed: Jun. 25, 2020

(51) Int. Cl.
| | |
|---|---|
| *B01J 20/20* | (2006.01) |
| *B01J 20/30* | (2006.01) |
| *B01J 20/28* | (2006.01) |
| *C02F 1/28* | (2023.01) |
| *C02F 101/30* | (2006.01) |

(52) U.S. Cl.
CPC .......... *B01J 20/20* (2013.01); *B01J 20/28054* (2013.01); *B01J 20/3021* (2013.01); *B01J 20/3078* (2013.01); *C02F 1/283* (2013.01); *B01J 2220/4812* (2013.01); *C02F 2101/308* (2013.01); *C02F 2209/06* (2013.01)

(58) Field of Classification Search
CPC ....................................................... B01J 20/20
See application file for complete search history.

(56) References Cited

U.S. PATENT DOCUMENTS

| | | | |
|---|---|---|---|
| 3,892,709 A | 7/1975 | Oda et al. | |
| 3,997,483 A | 12/1976 | Wurster et al. | |
| 8,227,376 B2 * | 7/2012 | Karies | B01J 20/28092 502/404 |

FOREIGN PATENT DOCUMENTS

| | | |
|---|---|---|
| FR | 2223078 A1 | 10/1974 |
| FR | 2434827 A1 | 3/1980 |

OTHER PUBLICATIONS

Drage et al., "Preparation of carbon dioxide adsorbents from the chemical activation at urea-formaldehyde and melamine-formaldehyde resins," Fuel, vol. 86, Issues 1-2, Jan. 2007, pp. 22-31.
Tokuhiro et al., "Adsorptive removal of methylene blue from simulated dyeing wastewater with melamine-formaldehyde-urea resin," Journal of Applied Polymer, vol. 112, Issue 6, pp. 3177-3774, Mar. 6, 2009.
Patel et al., "Removal and decolorization Adsorption study of dye bearing textile effluents by Sulfinated Urea-Formaldehyde resin," Advances in Applied Science Research, 2016, 7(4): 222-227.
Nath et al., "Recycling of end-of-life Melamine at 1 600° C. for Carbon Dissolution into Liquid Iron," ISIJ International, vol. 52, No. 5, May 2012, pp. 922-927.

* cited by examiner

*Primary Examiner* — Stuart L Hendrickson
(74) *Attorney, Agent, or Firm* — Nath, Goldberg & Meyer; Richard C. Litman (57) ABSTRACT

A melamine-formaldehyde derived porous carbon adsorbent may be prepared from melamine-formaldehyde derived porous carbon disposable products. The melamine-formaldehyde derived porous carbon effectively removes organic pollutants from aqueous media. Parameters of contact time, solution pH, initial adsorbate concentration and desorption rate affect efficacy. Adsorption capacities of exemplary melamine-formaldehyde derived porous carbon for MG and MB dyes at 298 K were up to 25 mg/g and 35 mg/g, respectively.

5 Claims, 7 Drawing Sheets

MELAMINE-FORMALDEHYDE DERIVED POROUS CARBON ADSORBENT

BACKGROUND

1. Field

The disclosure of the present patent application relates to a composition useful as an adsorbent, and particularly, to a melamine-formaldehyde derived porous carbon adsorbent prepared from waste melamine-formaldehyde products and methods for their preparation and use.

2. Description of the Related Art

Organic pollutants can significantly harm aquatic environments if not removed. For example, organic dyes discharged into the environment as residues of textile and other coloring industrial applications, significantly affect aquatic life and plants by reducing sunlight transmission through water, and possibly causing toxic and carcinogenic effects on organisms in the environment or directly or indirectly in contact with the environment. Methods of removing organic pollutants such as organic dyes from waters and wastewaters to decrease their impact on the environment are greatly needed.

Adsorption is a convenient and effective approach applicable for a wide variety of dyes. Adsorbents presently used for the removal of dyes from aqueous solutions include, for example, pine sawdust, bagasse fly ash, polyurethane foam, cyclodextrin-based adsorbent, activated carbon, iron humate, oil palm trunk fiber, clays and carbon prepared from *Arundo donax* root, etc.

Thus, a composition useful as an adsorbent for organic pollutants made from melamine formaldehyde waste solving the aforementioned problems are desired.

3. SUMMARY

An embodiment of the present subject matter is directed to a method for preparing an adsorbent for removing organic pollutants from an aqueous environment. The method can include providing a used disposable product including melamine-formaldehyde resin, reducing the product into pieces, heating the pieces over a set time period, changing to the heating temperature to a higher temperature and maintaining the higher temperature until an end of the set time period to form carbonized melamine-formaldehyde, reducing the carbonized melamine-formaldehyde to a powder; and drying and washing the carbonized melamine-formaldehyde powder to provide the adsorbent.

Other embodiments are the adsorbent prepared by the method and methods of using th adsorbent to remove organic pollutants from an aqueous environment.

These and other features of the present subject matter will become readily apparent upon further review of the following specification.

4. BRIEF DESCRIPTION OF THE DRAWINGS

Similar reference characters denote corresponding features consistently throughout the attached drawings.

5. DETAILED DESCRIPTION OF THE PREFERRED EMBODIMENTS

A melamine-formaldehyde derived porous carbon adsorbent, as described herein, can effectively adsorb organic pollutants from an aqueous solution. In particular, the melamine-formaldehyde derived porous carbon adsorbent can adsorb malachite green (MG) and methylene blue (MB) dyes from an aqueous environment.

Melamine formaldehyde resin is widely used for the manufacture of many disposable products, such as disposable dishware, kitchen utensils, and toys. Melamine is a six membered heterocyclic aromatic organic compound with three amino groups and is widely used as a nitrogen containing precursor to enrich carbons in electrochemical capacitor materials.

Figure 2:
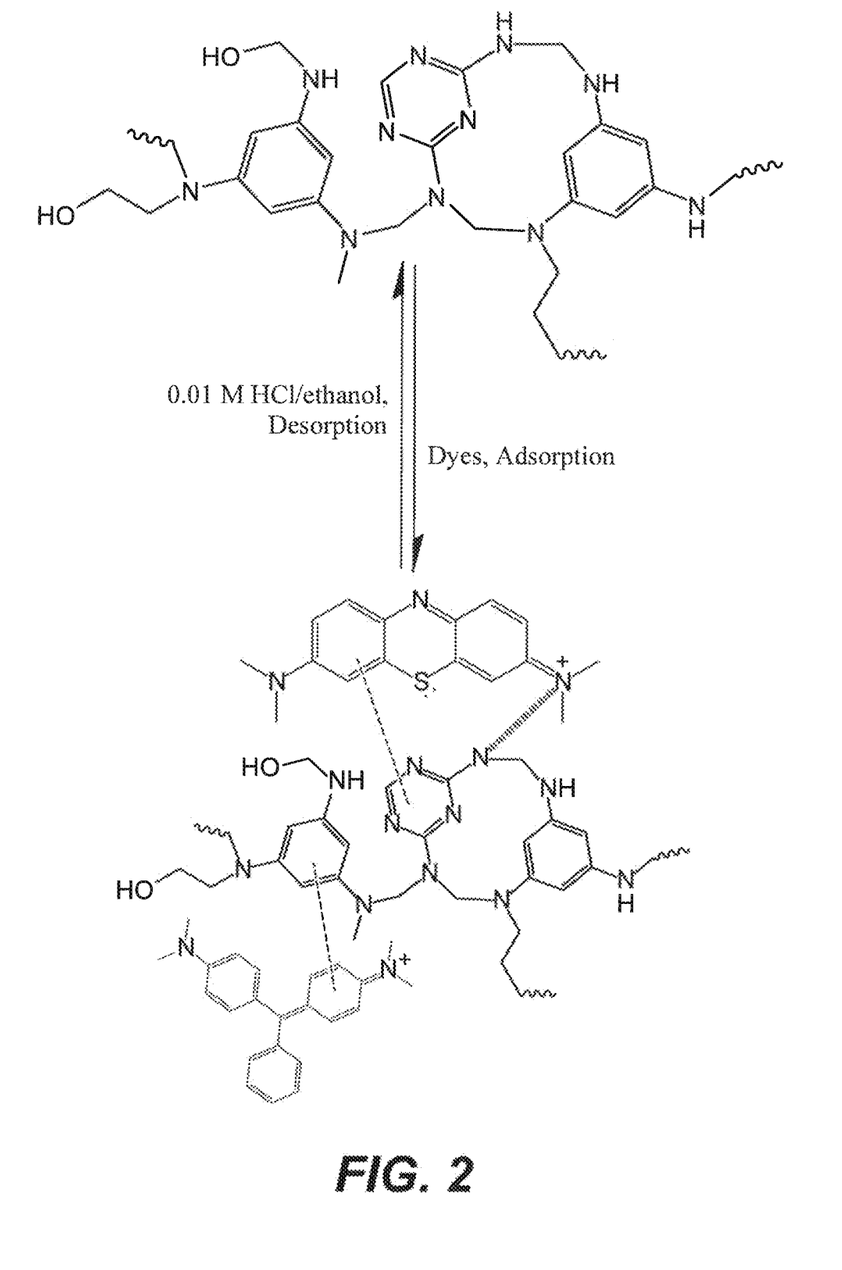
FIG. 2 is a proposed scheme for bonding of malachite green and methylene blue dyes with the melamine-formaldehyde derived porous carbon adsorbent.

A method of removing organic pollutants from an aqueous solution can include the steps of: (i) contacting the aqueous solution with the melamine-formaldehyde derived porous carbon adsorbent for a time duration to saturate the melamine-formaldehyde derived porous carbon with the organic pollutants in the aqueous solution and (ii) controlling the pH using 0.1 M aqueous solutions of HCl or NaOH. In an embodiment, the organic dyes can include at least one of malachite green (MG) and methylene blue (MB) dyes. FIG. 2 depicts a proposed scheme for bonding of MG and MB with the adsorbent.

After contacting the aqueous solution with the melamine-formaldehyde derived porous carbon adsorbent, a remaining concentration of the organic pollutants in the solution can be determined by UV-Vis spectrophotometer, e.g., at 627 nm for MG and at 665 nm for MB. The organic pollutants can be desorbed from the saturated melamine-formaldehyde derived porous carbon adsorbent using an eluting agent. For example, a 0.01 M solution of HCl, a 0.01 M solution of $HNO_3$, or a mixture of 0.01 M solution of HCl and $C_2H_5OH$ can be used as eluting agents to remove the organic pollutants and enable reuse of the melamine-formaldehyde derived porous carbon adsorbent.

Figure 7:
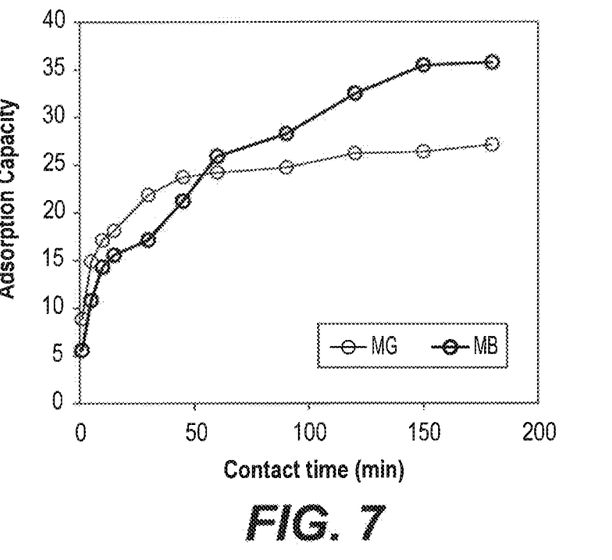
FIG. 7 is a composite plot showing adsorption capacity of the exemplary melamine-formaldehyde derived porous carbon as a function of contact time for malachite green and methylene blue dyes.

The adsorbent can be contacted with an aqueous solution, e.g., a body of water or wastewater, that is contaminated with organic pollutants to remove the organic pollutants by, for example, batch adsorption. The aqueous solution can have a neutral pH, e.g., pH 7, or a pH that may be adjusted according to the nature of the organic pollutant to be adsorbed. For example, if the organic pollutant is a cationic compound, the pH of the aqueous environment can be adjusted to be more basic. If the organic pollutant is an anionic compound, the aqueous environment can be adjusted to be more acidic. The adsorbent can have an adsorptive capacity of about 5 mg/g to about 40 mg/g depending on the organic pollutant. For example, adsorption capacities of exemplary melamine-formaldehyde derived porous carbon for MG and MB dyes at 298 K can be up to about 25 mg/g and 35 mg/g, respectively (FIG. 7). The adsorbent can then be isolated by filtration, for example, or by any other means of separating the adsorbent from the aqueous solution. Any known effective separation technique may be used, such as filtering, sedimentation, centrifugation, etc.

The melamine-formaldehyde derived porous carbon adsorbent can be made from waste or used melamine-formaldehyde products, e.g., waste dishware. The products can be washed, crushed into pieces, and annealed in a furnace. A range of temperatures appropriate for achieving the present melamine-formaldehyde derived porous carbon may be employed, as well as a range of heating rates. An exemplary range of about 600° C. to about 1000° C. can produce non-distorted graphite carbon. It should be understood that, based on particular materials and settings, this range may be broadened to produce the melamine-formaldehyde derived porous carbon of the present subject matter. The resultant melamine-formaldehyde derived porous carbon can be powdered, washed, e.g., with a suitable acid and distilled water, and dried in a vacuum oven (FIG. 1C). Any laboratory mill suitable for fine comminution may be used.

The organic pollutants can include organic dyes, such as MG and MB. The adsorbent can substantially adsorb organic pollutants from the aqueous solution in less than 180 minutes after contacting the contaminated water for a duration of time, for example, from 40 minutes to 150 minutes. The adsorption step can be carried out at room temperature at a pH above 6, for example at a pH ranging from pH 8 to pH 10. An optimum concentration of the adsorbent can be about 0.15-0.5 wt. %. The adsorbent can efficiently remove organic pollutants from aqueous solution and can be advantageously employed in controlling environmental pollution. The adsorbent is biocompatible and ecofriendly.

After the adsorbent has been used to remove the organic pollutants, the adsorbent can be regenerated or recycled for reuse by placing the adsorbent in contact with a regenerating solution, such as an acidic solution. The regenerating solution separates the adsorbent from the adsorbed organic pollutants. The adsorbent can be reused multiple times.

It should be understood that the amounts of materials for the methods described herein are exemplary, and appropriate scaling of the amounts are encompassed by the present subject matter, as long as the relative ratios of materials are maintained. As used herein, the term "about," when used to modify a numerical value, means within ten percent of that numerical value. The following examples illustrate the present teachings.

EXAMPLES

Example 1

Synthesis of Exempla Melamine-Formaldehyde Derived Porous Carbon

Figure 1A:
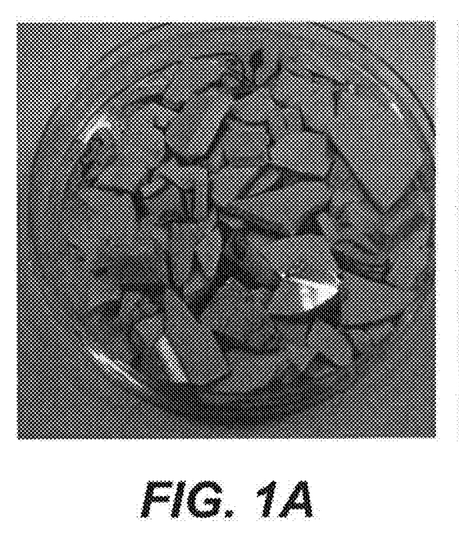
FIGS. 1A-1D show images of melamine-formaldehyde used disposable dishware at different steps of the exemplary synthesis method to produce a melamine-formaldehyde derived porous carbon adsorbent.
Figure 1B:
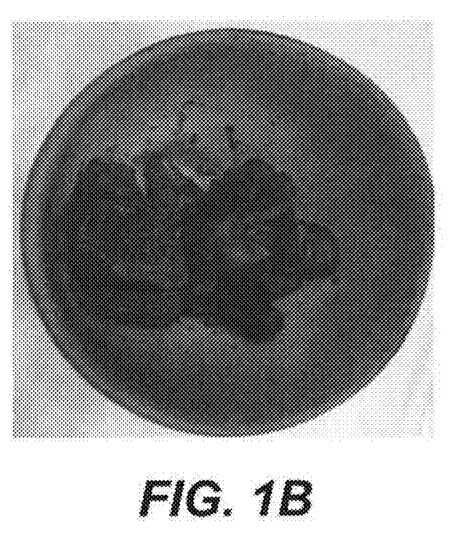
Figure 1C:
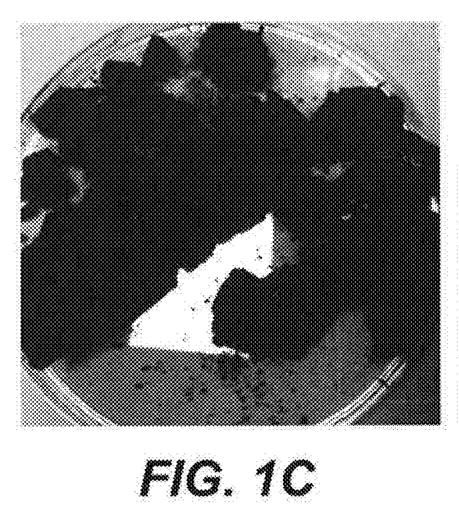

Waste melamine-formaldehyde dishware was collected locally, washed several times with distilled water to remove all dust particles and crushed manually into small pieces (FIG. 1A). The melamine-formaldehyde dishes were primarily composed of melamine-formaldehyde resins and did not include substantial contaminants of any other materials. The small pieces of melamine-formaldehyde dishes were annealed in a tube furnace at 800° C. for 5 h, including the temperature ramp up time, using a heating rate of 5° C./min under the flow of helium (100 mL/min) (FIG. 1B).

Figure 1D:
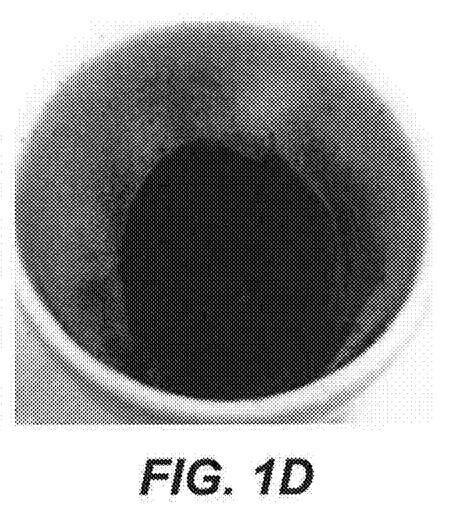

The resultant melamine-formaldehyde derived porous carbon was powdered using vibratory micro mill pulverisette (FRITSCH Vibratory Micro Mill PULVERISETTE 0; FIG. 1C), washed with dilute HCl, distilled water, and dried in a vacuum oven (FIG. 1D). Vacuum drying was performed in a vacuum of 0.03-0.06 atm at 60° C. for 24 hours.

Example 2

Characterization of Exemplary Melamine-Formaldehyde Derived Porous Carbon

Figure 3:
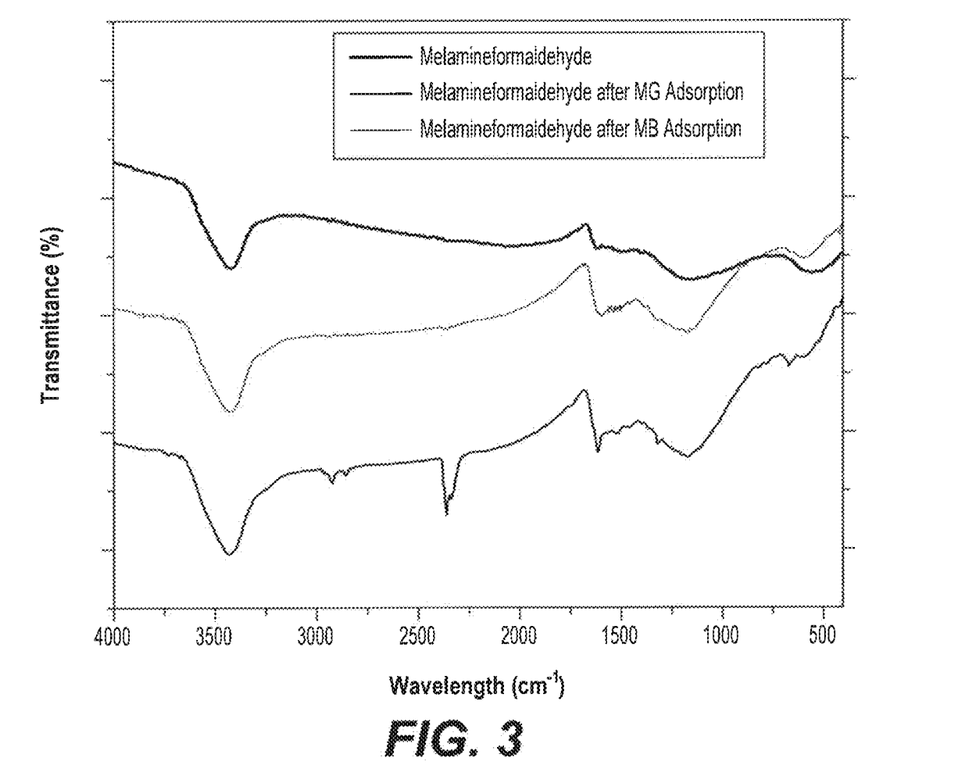
FIG. 3 is an acquired Fourier-transform infrared spectroscopy (FTIR) spectrum of exemplary melamine-formaldehyde derived porous carbon before and after dye adsorption from wastewater.

FIG. 3 shows the FTIR spectrum of the melamine-formaldehyde carbon adsorbent, prepared in Example 1, before and after dyes adsorption. The FTIR spectra of the fabricated composites revealed that the carbon matrix contains C=C and C=N groups. The peak at 3340 $cm^{-1}$ is assigned to the presence of the amino groups in the carbon matrix.

Figure 4:
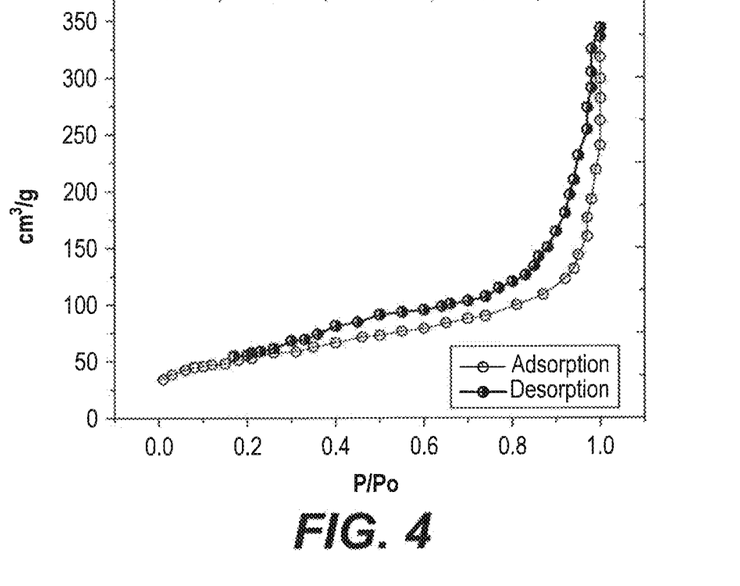
FIG. 4 is the $N_2$ adsorption/desorption isotherm of exemplary melamine-formaldehyde derived porous carbon.
Figure 5:
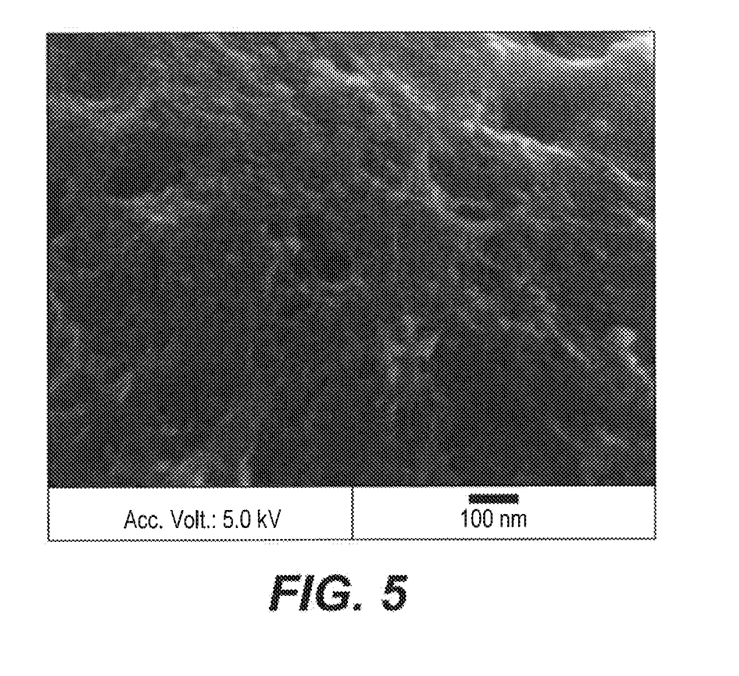
FIG. 5 is a scanning electron microscopy (SEM) image of the exemplary melamine-formaldehyde derived porous carbon.

The morphology of the fabricated carbon was characterized using SEM techniques. The SEM image revealed that the carbon has a porous structure as shown in FIG. 5. The high adsorption of MG and MB dyes onto the melamine-formaldehyde derived porous carbon adsorbent might be due to the highly porous nature of melamine-formaldehyde porous carbon. FIG. 4 is a plot of $N_2$ adsorption-desorption isotherm for the melamine-formaldehyde derived porous carbon prepared in Example 1. The adsorption isotherm was of type IV and the Brunauer-Emmett-Teller (BET) surface area of melamine-formaldehyde derived porous carbon adsorbent was found to be 348 $m^2/g$.

Example 3

Adsorption by Melamine-Formaldehyde Derived Porous Carbon

A batch method was employed for adsorption of MG and MB dyes by exemplary melamine-formaldehyde derived porous carbon as prepared in Example 1. Adsorption was performed in 100 mL Erlenmeyer flasks containing 25 mL of a 20 mg/L solution of either MG or MB in water. 20 mg of melamine-formaldehyde derived porous carbon was added to each flask and the flasks were shaken to mix. The flasks were sealed to avoid any change in volume of the solution through evaporation. The solution was stirred uninterruptedly at a constant temperature for a time sufficient to attain equilibrium (approximately 60 minutes, but not particularly limited thereto). After the equilibration time, the melamine-formaldehyde derived porous carbon saturated with dye was separated from the solution by filtering, and the remaining concentrations of dyes in the solution phase were determined by UV-Vis spectrophotometer at 627 nm (MG) and 665 nm (MB). A number of parameters (such as pH, contact time and adsorbent dose) were changed in order to optimize the adsorption process. The amount of the dye adsorbed at equilibrium was computed as:

$$qe, \text{mg/g} = Co - Ce\frac{V}{m} \quad (1)$$

$$\% \text{ adsorption} = \frac{Co - Ce}{Co} \times 100 \quad (2)$$

where V is the volume of dyes solution in liters, $C_0$ and $C_e$ are the initial and final concentrations (mg $L^{-1}$) of dyes in solution, and m is the weight of melamine-formaldehyde derived porous carbon in grams.

Figure 6:
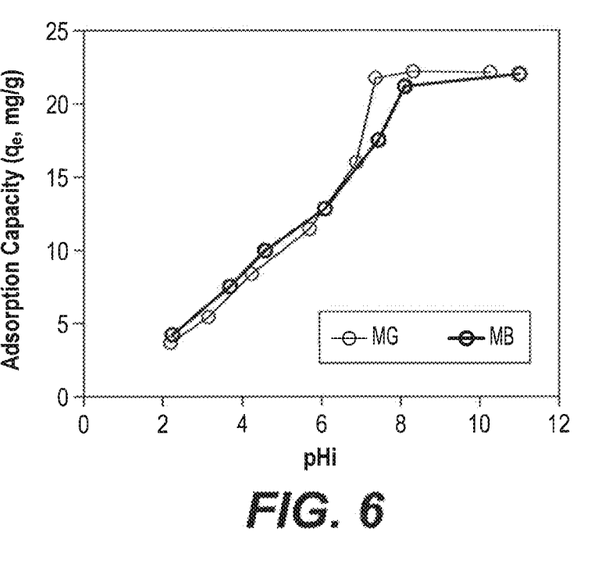
FIG. 6 is a composite plot showing adsorption capacity of the exemplary melamine-formaldehyde derived porous carbon as a function of initial pH for malachite green and methylene blue dyes.

FIG. 6 is a composite plot demonstrating the adsorption capacity as a function of pH for the adsorption of MG and MB dyes onto melamine-formaldehyde porous carbon. Maximum adsorption of MG and MB dyes was achieved at pH values of around 6 and around 8 and above, respectively. In general, the adsorption capacity increases with pH. The increased adsorption capacity for MG and MB dyes with increasing pH is presumably due to the fact that the concentration of negative charge on the surface of melamine-formaldehyde derived porous carbon increases with increasing pH, allowing for more efficient adsorption of the cationic dyes. Thus, adsorption may be optimized accordingly for other target organic pollutants by adjusting pH of the environment.

FIG. 7 is a composite plot showing the adsorption capacity as a function of contact time for the adsorption of MG and MB dyes onto melamine-formaldehyde porous carbon. The adsorption of both dyes was enhanced by increasing the contact time from 1 to 180 min until an approximate equilibrium was reached. A maximum number of MB and MG dyes molecules was removed from the water medium within 180 min in the exemplary embodiments. Substantial dye was adsorbed after contact times of 45 min for MG and 50-150 min for MB.

Figure 8A:
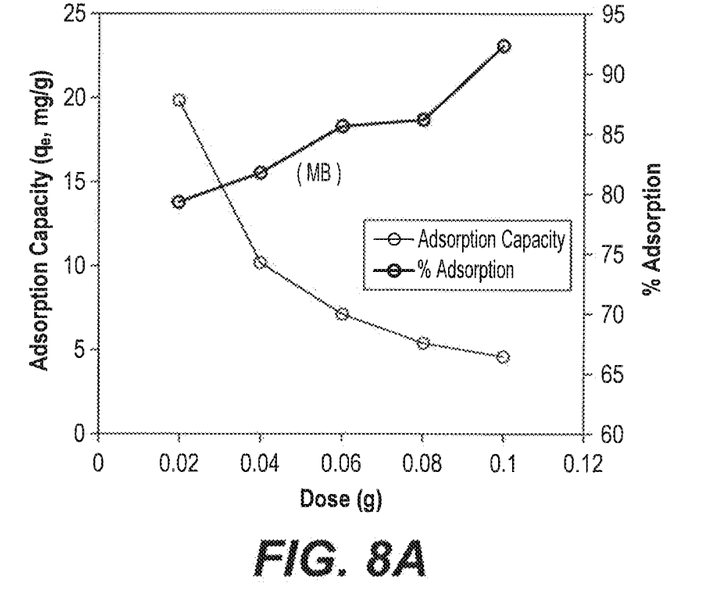
FIGS. 8A and 8B are composite plots showing the adsorption capacity and percent adsorption of the exemplary melamine-formaldehyde derived porous carbon as a function of adsorbent dose for malachite green and methylene blue dyes, respectively.
Figure 8B:
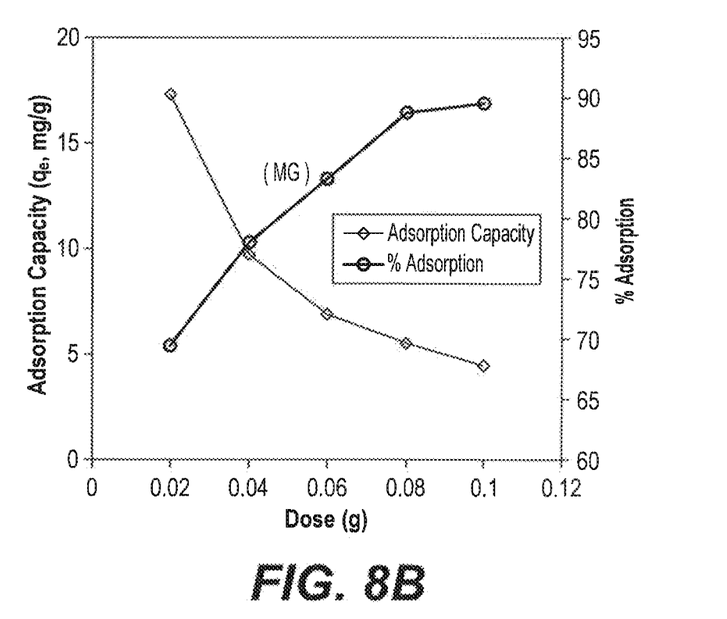

FIGS. 8A and 8B are composite plots showing the adsorption capacity as a function of adsorbent dose for the adsorption of MB and MG dyes, respectively, onto exemplary melamine-formaldehyde derived porous carbon. It was noted that the adsorption capacity of MG and MB dyes decreased from 17.4 to 4.5 mg/g and from 19.8 to 4.6 mg/g, respectively, with increasing the adsorbent dose from 20 mg to 100 mg, which might be due to the aggregation of melamine-formaldehyde derived porous carbon particles causing a decrease in adsorbent total surface area and increased diffusional path. The removal percentage of MG and MB dyes increased from 69 to 90% and 79 to 92% by increasing the melamine-formaldehyde derived porous carbon dose due to the increased availability of adsorption sites. This suggests the possibility of choosing a dose of melamine-formaldehyde derived porous carbon that meets a desired efficiency and adsorption efficacy. For example, in the exemplary application, a dose of 40-100 mg, or 60-80 mg melamine-formaldehyde derived porous carbon to 25 mL aqueous environment (i.e., weight percentages from 0.16-0.4 wt. % or 0.24-0.32 wt. %) may be desired, such as when the organic pollutant is either MB or MG.

Example 3

Desorption from and Recovery of Melamine-Formaldehyde Derived Porous Carbon

Regeneration of the exemplary melamine-formaldehyde derived porous carbon adsorbent was demonstrated as follows. 20 mg of the above exemplary melamine-formaldehyde derived porous carbon (saturated with either of the model dyes) separated from solution phase, as discussed in Example 3, was treated with 25 mL of different eluents (0.01 M HCl, 0.01 M $HNO_3$ and a mixture of 0.01 M solution of HCl and $C_2H_5OH$) in the Erlenmeyer flask under ambient temperature (298 K). After the equilibration time, the solutions were separated and the remaining concentrations of dyes in the solution phase were determined by UV spectroscopy. The % desorption of dyes was computed as: Conc. of dyes desorbed by eluent $$\% \text{ desorption} = \frac{Conc. \text{ of dye desorbed by eluent}}{Conc. \text{ of dyes adsorbed on adsorbent}} \times 100 \quad (3)$$

Figure 9A:
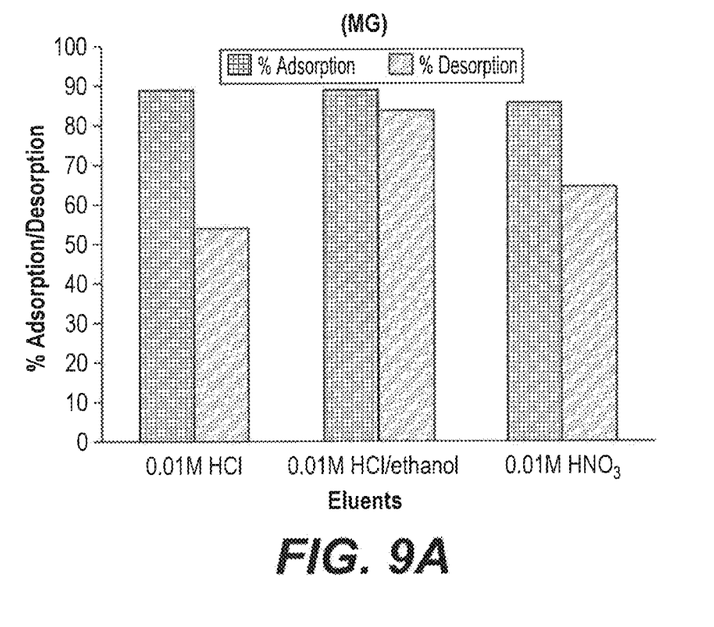
FIGS. 9A and 9B are charts showing the regeneration of melamine-formaldehyde derived porous carbon saturated with malachite green and methylene blue dyes, respectively, by elution with solutions of 0.01 M HCl, 0.01 M $HNO_3$, and 0.01 M HCl mixed with 0.01 M $C_2H_5OH$.
Figure 9B:
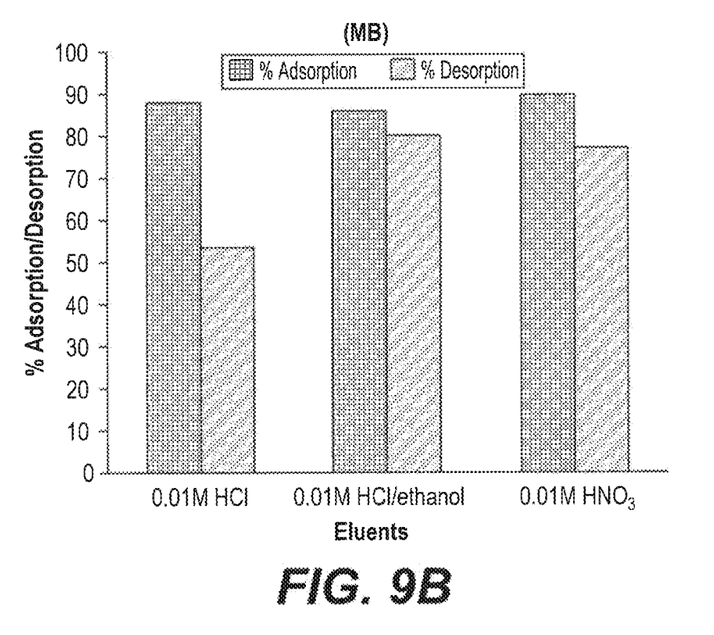

FIGS. 9A and 9B show the regeneration of the exemplary melamine-formaldehyde derived porous carbon after elution with the various eluents above. A mixture of 0.01 M HCl/$C_2H_5OH$ solution exhibited the highest desorption efficiency of 84% and 80% for MG and MB dyes, respectively.

It is to be understood that the melamine-formaldehyde derived porous carbon and related compositions and methods are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method for preparing an adsorbent for removing organic pollutants from an aqueous environment, comprising:
   providing a product including a melamine-formaldehyde resin;
   reducing a size of the product to provide a plurality of product pieces;
   heating the plurality of product pieces to form carbonized melamine-formaldehyde;
   pulverizing the carbonized melamine-formaldehyde to form a powder;
   washing the powder; and
   drying the powder to provide the adsorbent.

2. The method for preparing an adsorbent according to claim 1, wherein the plurality of product pieces are heated to a temperature ranging from about 600° C. to about 1000° C.

3. The method for preparing an adsorbent according to claim 2, wherein the temperature is changed at a rate of about 1-10° C./min.

4. The method for preparing an adsorbent according to claim 1, wherein the plurality of product pieces of melamine-formaldehyde resin are heated to a temperature of about 800° C. for about 5 hours with a heating rate of about 5° C./min under the flow of helium.

5. The method for preparing an adsorbent according to claim 1, wherein the drying is performed in a vacuum.

* * * * *